United States Patent [19]

Dickinson et al.

[11] 3,900,480

[45] Aug. 19, 1975

[54] N-(2-PYRIDYL)-1-POLYMETHYLENEIMINOTHIOCARBOXAMIDES

[75] Inventors: William B. Dickinson, Albany; Marcia P. Vaupotic, Sand Lake, both of N.Y.

[73] Assignee: Sterling Drug Inc., New York, N.Y.

[22] Filed: July 1, 1974

[21] Appl. No.: 484,443

Related U.S. Application Data

[60] Continuation-in-part of Ser. No. 422,863, Dec. 7, 1973, abandoned, which is a division of Ser. No. 287,620, Sept. 11, 1972, Pat. No. 3,835,145.

[30] Foreign Application Priority Data

Aug. 13, 1973 United Kingdom............. 38310/73
Mar. 1, 1974 United Kingdom............... 9414/74

[52] U.S. Cl................. 260/293.69; 260/294.8 H
[51] Int. Cl.............................................. C07d 29/36
[58] Field of Search..... 260/293.69, 294.8 H, 552 R

[56] References Cited
UNITED STATES PATENTS 3,708,496  1/1973  Kersten et al................. 260/552 R
3,806,511  4/1974  Tanaka et al................. 260/294.8 H

*Primary Examiner*—Henry R. Jiles
*Assistant Examiner*—S. D. Winters
*Attorney, Agent, or Firm*—William G. Webb; B. Woodrow Wyatt

[57] ABSTRACT

N-(2- and 3-Pyridyl)-1-polymethyleneiminothiocarboxamides, having useful anthelmintic activity, are prepared by reaction of a 2- or 3-pyridylamine with thiophosgene followed by reaction of the resulting product with a polymethyleneimine or by reaction of a 2- or 3-pyridylamine with carbon disulfide in the presence of either a tri-lower-alkylamine or an alkali metal carbonate, an alkali metal hydroxide or alkali metal hydride, followed by reaction of the resulting tri-lower-alkylammonium or alkali metal 2- or 3-pyridyldithiocarbamate with a lower-alkyl halide, and reaction of the resulting lower-alkyl 2- or 3-pyridyldithiocarbamate with a polymethyleneimine.

19 Claims, No Drawings

N-(2-PYRIDYL)-1-POLYMETHYLENEIMINOTHI-OCARBOXAMIDES

This application is a continuation-in-part of our prior co-pending application Ser. No. 422,863, filed Dec. 7, 1973, now abandoned, which in turn is a division of our prior, co-pending application Ser. No. 287,620, filed Sept. 11, 1972, now U.S. Pat. No. 3,835,145, patented Sept. 10, 1974.

This invention relates to N-(2- and 3-pyridyl)-1-polymethyleneiminothiocarboxamides, which are useful as anthelmintic agents, and to processes for their preparation.

Certain compounds of the invention are represented by the formula Ia:

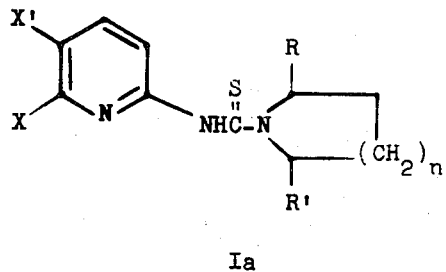

Ia wherein:
X is hydrogen, lower-alkyl or lower-alkoxy;
X' is hydrogen, bromine, chlorine, lower-alkyl, carbo-lower-alkoxy or di-lower-alkylamino;
R is hydrogen, lower-alkyl or hydroxymethyl;
R' is hydrogen or lower-alkyl; and
$n$ is 1 or 2 except that:
  a. when each of X and X' is hydrogen and $n$ is 2, or when X is hydrogen, X' is bromine and $n$ is 1, R and R' are not both hydrogen;
  b. when X is hydrogen, X' is lower-alkyl and $n$ is 2, either both R and R' are lower-alkyl or one is hydrogen and the other lower-alkyl; and
  c. when X is hydrogen, X' is lower-alkyl and $n$ is 1, R and R' are not both lower-alkyl or both hydrogen.

Also contemplated by the invention are compounds having the formula Ib:

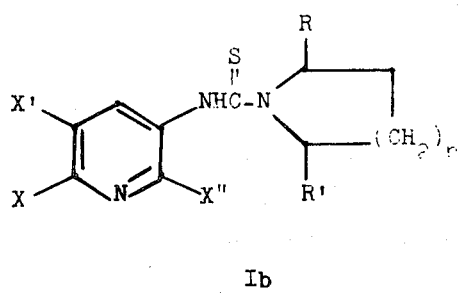

Ib wherein:
X is hydrogen, lower-alkyl or lower-alkoxy;
X' is hydrogen, bromine, chlorine, lower-alkyl, carbo-lower-alkoxy or di-lower-alkylamino;
X'' is hydrogen or lower-alkoxy;
R is hydrogen, lower-alkyl or hydroxymethyl;
R' is hydrogen or lower-alkyl; and
$n$ is 1 or 2 except that:
  when X and X'' are both hydrogen, X' is lower-alkyl and $n$ is 2, R and R' are not both lower-alkyl.

The above limitations in the scope of the invention are included for the purpose of excluding from the purview of the invention compounds which we have found possess such a low order of anthelmintic activity at non-toxic doses as to be of only limited utility as anthelmintic agents.

Particularly preferred compounds within the ambit of the invention as described above are those of formula Ia wherein X is hydrogen or lower-alkyl; X' is hydrogen, bromine, chlorine, lower-alkyl or di-lower-alkylamino; $n$ is 2 and R and R' have the meanings given above, and also those of formula Ib wherein X is lower-alkoxy; X' and X'' are both hydrogen; R and R' are both lower-alkyl; and $n$ is 2.

For the sake of brevity, the compounds of formulas Ia and Ib will be hereinafter referred to as the compounds of formula I having the composite general formula:

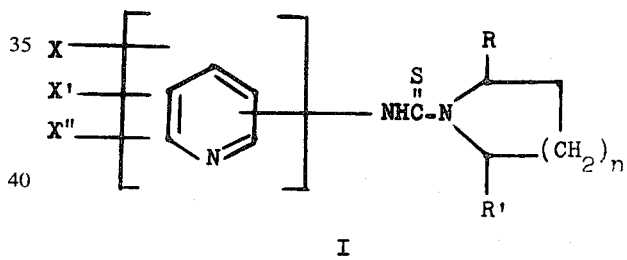

I

As used herein, the terms "lower-alkyl" and "lower-alkoxy" mean saturated, monovalent aliphatic radicals, including straight or branched-chain radicals, of from one to four carbon atoms, as illustrated by, but not limited to, methyl, ethyl, propyl, isopropyl, butyl, sec.-butyl, isobutyl, methoxy, ethoxy, propoxy, isopropoxy, butoxy, and the like.

The compounds of formula I are prepared by reaction of a 2- or 3-pyridylisothiocyanate of formula II with an appropriate polymethyleneimine of formula III. The reaction is represented as follows:

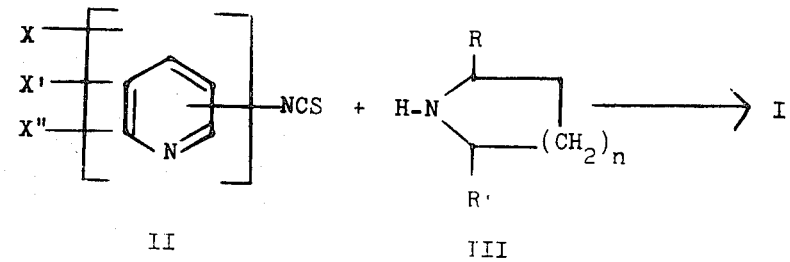

II      III wherein X, X', X'', R, R' and n have the meanings given above, and where formula II is to be understood as representing a composite general formula of compounds of formulas IIa and IIb as follows:

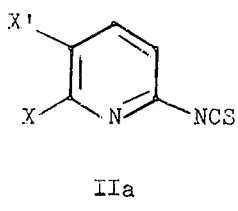

IIa        IIb

The reaction is carried out in an aprotic, organic solvent inert under the conditions of the reaction, for example diethyl ether, hexane, benzene, toluene, xylene, chloroform, ethyl acetate, and the like. Preferred solvents are diethyl ether, hexane and toluene. The reaction generally takes place at room temperature, but if desired, reaction can be expedited by heating the mixture to the boiling point of the solvent used.

The isothiocyanates of formula II are, in turn, prepared by reacting, at a temperature in the range from 0°–40°C., an appropriate 2- or 3-pyridylamine of formula IV with thiophosgene, preferably in the presence of an acid-acceptor. The reaction is represented by the equation:

$$\text{IV} \quad + \quad CSCl_2$$

$$\text{II} \quad + \quad 2HCl$$

wherein X, X' and X'' have the meanings given above, and where formula IV is to be understood as representing a composite general formula of compounds of formulas IVa and IVb as follows:

IVa        IVb

The reaction is carried out in an organic solvent inert under the conditions of the reaction, for example chloroform, methylene dichloride, ethylene dichloride, benzene, toluene, xylene, ethyl acetate, hexane, and the like. A preferred solvent is methylene dichloride, and a preferred acid-acceptor is an alkali metal bicarbonate, for example sodium bicarbonate, or an alkaline earth carbonate, for example calcium carbonate.

Alternatively, the 2- and 3-pyridylisothiocyanates of formula II can be prepared by the method of Jochims, Ber. 101, 1751 (1968) in which a 2- or 3-pyridylamine is reacted with carbon disulfide and dicyclohexylcarbodiimide in the presence of a strong base, for example a tri-lower-alkylamine such as triethylamine, and at a temperature below 0°C. to give the corresponding 2- or 3-pyridylisothiocyanate and N,N'-dicyclohexylthiourea. The method is represented by the following reaction sequence:

$$Py-NH_2 + CS_2 \rightarrow Py-NH-\overset{SH}{\underset{}{C}}=S$$

$$Py-NH-\overset{SH}{\underset{}{C}}=S + Cyc-N=C=N-Cyc \rightarrow \begin{bmatrix} Cyc-NH-C=N-Cyc \\ | \\ S \\ | \\ Py-NH-C=S \end{bmatrix}$$

$$Py-NCS + Cyc-NH-\overset{S}{\underset{}{\overset{\|}{C}}}-NH-Cyc$$

wherein Py represents a 2- or 3-pyridyl (or substituted 2- or 3-pyridyl) group, and Cyc represents the cyclohexyl group.

Another method for preparing the compounds of formula I comprises reacting an appropriate polymethyleneimine of formula III with one molar equivalent of thiophosgene in the presence of an acid-acceptor, for example an alkali metal carbonate, in an inert organic solvent, for example benzene, toluene or ethylene dichloride, and reacting the resulting N-polymethyleneiminothiocarbonyl chloride with an appropriate 2- or 3-pyridylamine of formula IV using the same conditions as used for the preparation of the N-polymethyleneiminothiocarbonyl chloride of formula IIIa. The method is represented by the following reaction sequence:

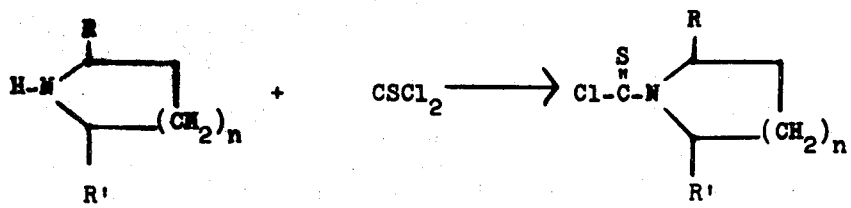

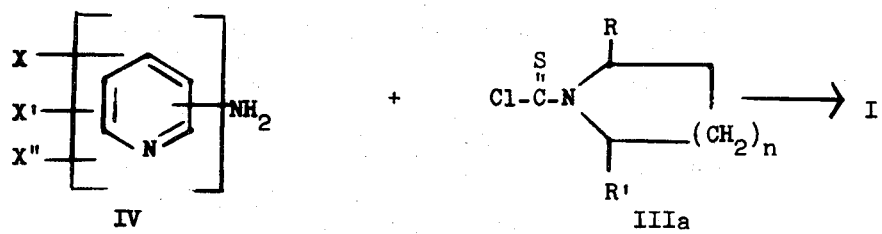

where X, X', X'', R, R' and *n* have the meanings given above.

The above methods employ a general method which comprises condensing either a pyridylamine of the formula IV*a* or IV*b* or a polymethyleneimine of the formula III with thiophosgene and reacting the compound obtained with the other of said first two mentioned compounds.

Still another method for preparing the compounds of formula I comprises reacting an appropriate 2- or 3-pyridylamine of formula IV with carbon disulfide in the presence of an alkali metal carbonate, an alkali metal hydroxide or an alkali metal hydride in an inert solvent, for example water, acetone, ethanol, methanol, benzene or tetrahydrofuran, followed by direct treatment of the resulting alkali metal 2- or 3-pyridyldithiocarbamate of formula V with a lower-alkyl halide and reaction of the resulting 2- or 3-pyridyl-lower-alkyl dithiocarbamate of formula VI with an appropriate polymethyleneimine of formula III. The latter reaction is preferably carried out in an inert organic solvent, for example acetone, acetonitrile or a lower-alkanol. The method is represented by the following reaction sequence:

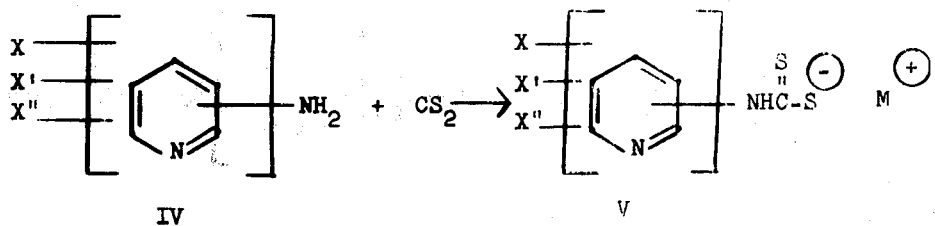

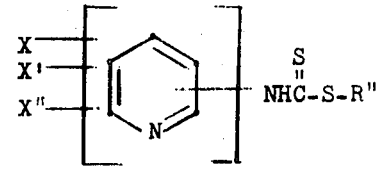

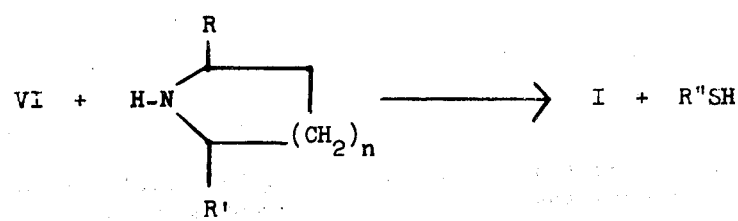

where X, X', X'', R, R' and n have the meanings given above, M⁺ represents an alkali metal cation, R'' represents lower-alkyl, and Hal represents halogen.

Alternatively, the 2- or 3-pyridylamines of formula IV can, in the initial step of the above-described sequence of reactions, be reacted with carbon disulfide in the presence of a tri-lower-alkylamine to form a tri-lower-alkylammonium 2- or 3-pyridyldithiocarbamate of formula V where the cation designated Me⁺ is, besides an alkali metal cation as described above, a tri-lower-alkylammonium ion. The reaction takes place at ambient temperature in an inert organic solvent, for example acetone, methanol, ethanol or acetonitrile, and due to the exothermic nature of the reaction, it is sometimes necessary to cool the mixture below the 46°C. boiling point of carbon disulfide, particularly when carrying out the procedure on a large scale.

The reaction of the tri-lower-alkylammonium 2- or 3-pyridyldithiocarbamate of formula V with a lower-alkyl halide is carried out at temperatures in the range from −10°C. to 25°C. and in an inert organic solvent, for example methanol, ethanol, acetone, chloroform or acetonitrile, while the reaction of the resulting lower-alkyl 2- or 3-pyridyldithiocarbamate of formula VI with a polymethyleneimine is preferably carried out at reflux temperature in an inert organic solvent, for example methanol, ethanol or acetonitrile, although reaction does take place, albeit more slowly, at lower temperatures down to ambient temperature. The method is represented by the following reaction sequence:

The 2- and 3-pyridylisothiocyanates of formula II are also useful as anthelmintic agents, and particularly preferred compounds for this purpose within the ambit of formula II are those of formula IIa where X is hydrogen, and X' is chlorine, bromine, lower-alkyl, or di-lower-alkylamino and also those of formula IIb where X is lower-alkoxy and X' is hydrogen.

The polymethyleneimines of formula III and the 2- and 3-pyridylamines of formula IV are both well-known classes of compounds and are generally commercially available.

The novel compounds of the instant invention are the compounds of formulas I and II and the acid-addition salts of the former. The compounds of formula I in free base form are converted to the acid-addition salt form by interaction of the base with an acid in an organic solvent and isolating the salt directly or by concentration of the solution. In like manner, the free base can be regenerated from the acid-addition salt form in the conventional manner, that is by treating the salts with cold, weak aqueous bases, for example alkali metal carbonates and alkali metal bicarbonates. The bases thus regenerated can then be interacted with the same or a different acid to give back the same or a different acid-addition salt. Thus the original bases and all of their acid-addition salts are readily interconvertible.

In standard biological test procedures, the compounds of formulas I and II have been found to possess anthelmintic activity and are useful as anthelmintic agents. Anthelmintic activity was determined in mice

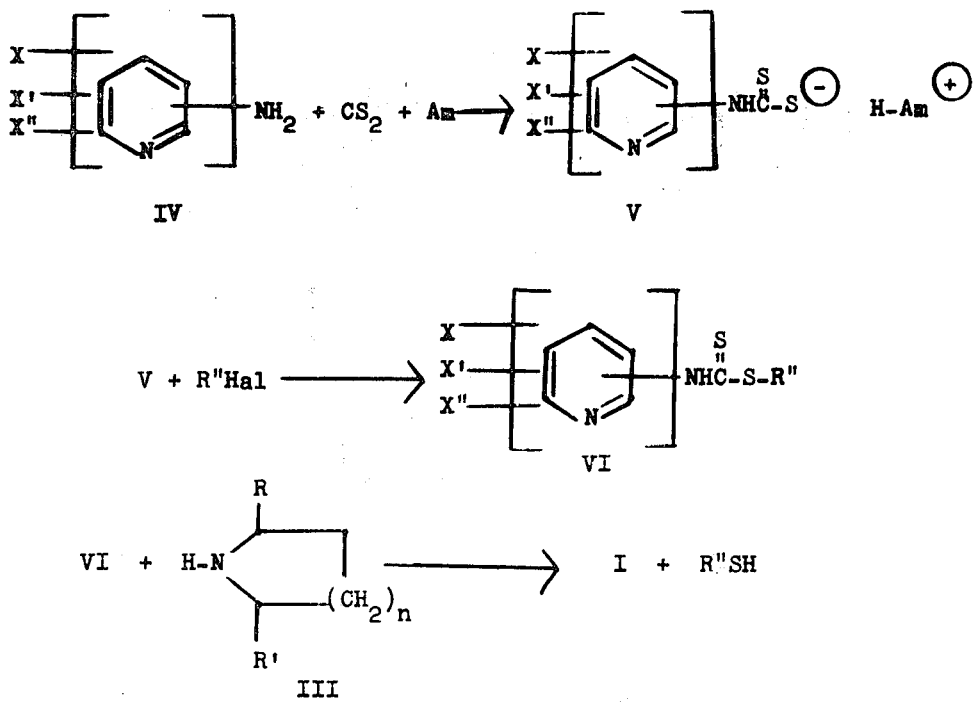

where X, X', X'', R, R', R'', n and Hal have the meanings given above, and Am represents a tri-lower-alkylamine.

against one species of Trichostrongyle nematode (*Nematospiroides dubius*), one species of pinworm (*Syphacia obvelata*), and one species of tapeworm (*Hy-*

*menolepis nana*) and in dogs against the hookworm, *Ancylostoma caninum*, and ascarid infections (*Toxocara canis* and *Toxascaris leonina*). The various test procedures used are described as follows: Swiss mice weighing approximately 20 grams were infected with approximately 20 larvae of *N. dubius* which were administered in 10% gelatin via stomach tube. For screening purposes, compounds, made up in 10% gelatin, were administered via stomach tube in equally divided daily doses for four consecutive days beginning fourteen days after infection. Four days after the final medication, the animals were sacrificed and examined for the presence of worms. Efficacy against *N. dubius* was judged on the basis of percent worm reduction compared to control non-medicated mice. In addition, for the purpose of evaluation, the compounds were administered orally to a series of animals at graded doses, each animal receiving a single dose, and the results against *N. dubius* expressed in terms of an Effective Dose$_{50}$ (ED$_{50}$), the ED$_{50}$ representing the dose necessary to remove 50 percent of the worm burden.

The same test procedures described above were used to assess the effectiveness of the compounds against *S. obvelata*, a naturally occurring pinworm infection in Swiss mice. Efficacy was judged by the percent of mice cleared of the infection compared to non-medicated control mice.

In tests against the tapeworm, *H. nana*, Swiss mice weighing approximately 20 grams were infected with approximately 1,000 ova of *H. nana* administered in 10% gelatin via stomach tube. The test compounds, made up in 10% gelatin, were administered via stomach tube in equally divided doses daily for four consecutive days beginning twelve days after infection. Four days after the final medication, the animals were sacrificed and examined for the presence of worms. Efficacy was judged by the percent of mice cleared compared to non-medicated control mice.

In tests against *A. caninum*, *T. canis* and *T. leonina* of naturally infected mongrel dogs, food was withheld from the dogs for a minimum of five hours prior to, and for three to five hours after, each administration of the test agent. Single doses of the test agent were administered orally in a gelatin capsule, as a suspension in gum tragacanth and in a solution of 2.5 to 5.0 percent peanut oil to groups of four to eleven dogs. The dogs were sacrificed four days after the medication, and the intestines examined for worms. Anthelmintic efficacy was expressed in terms of the percent reduction in Stoll fecal egg counts and in the number of worms counted at autopsy as well as by critical tests wherein each animal acts as its own control and a comparison is made of the number of worms removed from the feces after medication with the number of worms harbored by the animal at autopsy.

The 2- and 3-pyridylisothiocyanates of formula II and the N-(2- and 3-pyridyl)-1-polymethyleneiminothiocarboxamides of formula I were found to reduce or eliminate the helminth burden from infected mice or dogs when administered in the dose range of from 1 to 200 mg./kg. The compounds are preferably administered orally, and the amount of a particular compound to be administered, either by itself or as the essential active ingredient in a formulation, will range from 1 to about 200 mg./kg. The number of doses administered range from one to two per day for from one to five consecutive days, depending on the severity of the helminth infestation.

The actual determination of the numerical biological data definitive for a particular compound of formula I or II is readily determined by standard test procedures by technicians versed in pharmacological test procedures, without the need for any extensive experimentation.

The compounds of formulas I and II can be prepared for use by incorporation in unit dosage form as tablets or capsules for oral administration either alone or in combination with suitable adjuvants such as calcium carbonate, starch, lactose, sodium bicarbonate, sodium lauryl sulfate, sugar, dextrose, mannitol, cellulose, gum acacia, and the like. Alternatively, they can be formulated for oral administration in aqueous alcohol, glycol, or oil solutions or oil-water emulsions in the same manner as conventional medicinal substances are prepared. They can also be formulated for oral use with foodstuffs or admixed with foodstuffs for veterinary use.

The molecular structure of the compounds of the invention were assigned on the basis of study of their infrared, ultraviolet, and NMR spectra, and confirmed by the correspondence between calculated and found values for elementary analyses for the elements.

The following examples will further illustrate the invention without, however, limiting it thereto. All melting points are uncorrected.

EXAMPLE 1

Into a three-necked flask equipped with a mechanical stirrer and two dropping funnels and containing 34 g. (0.23 mole) of thiophosgene was added simultaneously and with vigorous stirring a solution of 50 g. (0.4 mole) of sodium bicarbonate in 500 ml. of water and a solution of 25.6 g. (0.2 mole) of 2-amino-5-chloropyridine in 600 ml. of methylene dichloride. When addition of both solutions was completed, the organic layer was separated, dried over anhydrous calcium sulfate and taken to dryness in vacuo. The dark residue was dissolved in about 2 liters of n-hexane, filtered, and concentrated to a volume of about 60 ml. The solid which crystallized out was collected and recrystallized once again from n-hexane to give 8.2 g. of 5-chloro-2-pyridylisothiocyanate, m.p. 41°–43°C.

The above 5-chloro-2-pyridylisothiocyanate (0.049 mole) was dissolved in 75 ml. of absolute ether, filtered, and treated with 5 ml. of 2,6-dimethylpiperidine. The mixture was chilled, and the solid which crystallized was collected and recrystallized from n-hexane to give 5.5 g. of N-(5-chloro-2-pyridyl)-2,6-dimethyl-1-piperidinethiocarboxamide, m.p. 109°–110°C.

EXAMPLE 2

Reaction of 5-chloro-2-pyridylisothiocyanate with 2,6-diethylpiperidine [Netherlands Application No. 6,605,452, published October 24, 1966; C.A. 66, P 104914e (1967)] using the manipulative procedure described above in Example 1 affords N-(5-chloro-2-pyridyl)-2,6-diethyl-1-piperidinethiocarboxamide.

EXAMPLE 3

Ten grams (0.06 mole) of 5-chloro-2-pyridylisothiocyanate dissolved in 50 ml. of n-hexane was reacted with 20 ml. of 2-methylpiperidine dissolved in 50 ml. of n-hexane using the procedure described above in Example 1. The product which separated from the cooled reaction mixture was collected and recrystallized from acetonitrile to give 20 g. of N-(5-chloro-2-pyridyl)-2-methyl-1-piperidinethiocarboxamide, m.p. 117°–119°C.

EXAMPLE 4

Reaction of 5-chloro-2-pyridylisothiocyanate with 2-ethylpiperidine; 2-isopropylpiperidine; 2-sec.-butylpiperidine [all described by Bruylants, Bull. soc. chim. Belg. 33, 467–78 (1924)]; 2-butylpiperidine or 2-isobutylpiperidine [both described by Menshikov et al., Ber. 69B, 1790–802 (1936)] using the manipulative procedure described above in Example 1 affords, respectively, N-(5-chloro-2-pyridyl)-2-ethyl-1-piperidinethiocarboxamide; N-(5-chloro-2-pyridyl)-2-isopropyl-1-piperidinethiocarboxamide; N-(5-chloro-2-pyridyl)-2-sec.-butyl-1-piperidinethiocarboxamide; N-(5-chloro-2-pyridyl)-2-butyl-1-piperidinethiocarboxamide; and N-(5-chloro-2-pyridyl)-2-isobutyl-1-piperidinethiocarboxamide.

EXAMPLE 5

Ten grams (0.06 mole) of 5-chloro-2-pyridylisothiocyanate in 250 ml. of toluene was treated with 7 ml. of piperidine using the procedure described above in Example 1. The crude product was recrystallized from n-hexane to give 3.0 g. of N-(5-chloro-2-pyridyl)-1-piperidinethiocarboxamide, m.p. 100°–102°C.

EXAMPLE 6

A solution of 8.5 g. (0.05 mole) of 5-chloro-2-pyridylisothiocyanate in 75 ml. of diethyl ether was treated with a solution of 5.8 g. (0.05 mole) of 2-hydroxymethylpiperidine in 100 ml. of diethyl ether using the procedure described above in Example 1. The crude product obtained from the reaction mixture was recrystallized from acetonitrile to give 5.0 g. of N-(5-chloro-2-pyridyl)-2-(hydroxymethyl)-1-piperidinethiocarboxamide, m.p. 145°–147.5°C.

EXAMPLE 7

A solution of 10 g. (0.06 mole) of 5-chloro-2-pyridylisothiocyanate in 230 ml. of toluene was treated with 8 ml. of 2,5-dimethylpyrrolidine using the procedure described above in Example 1. The material obtained from the reaction mixture was recrystallized from diethyl ether to give 4.0 g. of N-(5-chloro-2-pyridyl)-2,5-dimethyl-1-pyrrolidinethiocarboxamide, m.p. 114°–117°C.

EXAMPLE 8

Reaction of 5-chloro-2-pyridylisothiocyanate with 2-methyl-5-ethylpyrrolidine; 2-methyl-5-propylpyrrolidine; 2,5-diethylpyrrolidine; 2-ethyl-5-propylpyrrolidine; 2,5-dipropylpyrrolidine [all disclosed by Shuiken et al., Izv. Akad. Nauk S.S.S.R., Ser. Khim., 1964 (6), 1120–3; C.A. 61, 6980b (1964)]; 2-ethyl-5-isopropylpyrrolidine; 2,5-diisopropylpyrrolidine [both disclosed by Rothenmund et al., J. Am. Chem. Soc. 77, 3340 (1955)]; 2-methyl-5-isopropylpyrrolidine [Wagner-Juaregg et al., Helv. Chim. Acta. 45, 771–4 (1962)]; 2-propyl-5-butylpyrrolidine [Shuiken et al., Izv. Akad. Nauk S.S.S.R., Ser. Khim. 1963 (9) 1678-80; C.A. 59, 15246a (1963)]; 2-ethylpyrrolidine [DeJong et al., Rec. trav. chim. 49, 237–46 (1930)]; and 2-sec.-butylpyrrolidine [Menshikov. J. Gen. Chem. (U.S.S.R.) 7, 1632–4 (1937)] affords, respectively, N-(5-chloro-2-pyridyl)-2-methyl-5-ethyl-1-pyrrolidinethiocarboxamide; N-(5-chloro-2-pyridyl)-2-methyl-5-propyl-1-pyrrolidinethiocarboxamide; N-(5-chloro-2-pyridyl)-2,5-diethyl-1-pyrrolidinethiocarboxamide; N-(5-chloro-2-pyridyl)-2-ethyl-5-propyl-1-pyrrolidinethiocarboxamide; N-(5-chloro-2-pyridyl)-2,5-dipropyl-1-pyrrolidinethiocarboxamide; N-(5-chloro-2-pyridyl)-2-ethyl-5-isopropyl-1-pyrrolidinethiocarboxamide; N-(5-chloro-2-pyridyl)-2,5-diisopropyl-1-pyrrolidinethiocarboxamide; N-(5-chloro-2-pyridyl)-2-methyl-5-isopropyl-1-pyrrolidinethiocarboxamide; N-(5-chloro-2-pyridyl)-2-propyl-5-butyl-1-pyrrolidinethiocarboxamide; N-(5-chloro-2-pyridyl)-2-ethyl-1-pyrrolidinethiocarboxamide; and N-(5-chloro-2-pyridyl)-2-sec.-butyl-1-pyrrolidinethiocarboxamide.

EXAMPLE 9

Thiophosgene (8 g., 0.07 mole) in a three-necked round bottom flask was treated simultaneously with a solution of 11.3 g. (0.065 mole) of 2-amino-5-bromopyridine in 200 ml. of ethyl acetate and a solution of 10% aqueous sodium bicarbonate using the procedure described above in Example 1. There was thus obtained from the organic layer 9 g. of 5-bromo-2-pyridylisothiocyanate, m.p. 74°–76°C.

A solution of 3 g. (0.014 mole) of 5-bromo-2-pyridylisothiocyanate in 50 ml. of absolute ether was treated with a solution of 5 g. (0.04 mole) of 2,6-dimethylpiperidine using the procedure described above in Example 1. The solid which separated from the reaction mixture was collected and dried to give 4.5 g. of N-(5-bromo-2-pyridyl)-2,6-dimethyl-1-piperidinethiocarboxamide, m.p. 110°–112°C.

EXAMPLE 10

A solution of 10 g. (0.05 mole) of 5-bromo-2-pyridylisothiocyanate in 200 ml. of absolute ether was treated with 10 ml. of 2-methylpiperidine using the procedure described above in Example 1. The solid which separated from the cooled reaction mixture was collected and recrystallized from methanol to give 8.4 g. of N-(5-bromo-2-pyridyl)-2-methyl-1-piperidinethiocarboxamide, m.p. 123°–125°C.

EXAMPLE 11

A solution of 22.6 g. (0.2 mole) of thiophosgene in 30 ml. of methylene dichloride was treated simultaneously and with vigorous stirring with a solution of 24.8 g. (0.2 mole) of 3-amino-6-methoxypyridine and 320 ml. of a 10% aqueous sodium bicarbonate solution. The material obtained from the organic layer was recrystallized from n-hexane to give 22 g. of 6-methoxy-3-pyridylisothiocyanate, m.p. 54°–55°C.

A solution of 12 g. (0.08 mole) of 6-methoxy-3-pyridylisothiocyanate in 100 ml. of absolute ether was treated with 15 ml. of 2,6-dimethylpiperidine using the procedure described above in Example 1. The solid which separated from the reaction mixture was collected and dried to give 7.3 g. of N-(6-methoxy-3-pyridyl)-2,6-dimethyl-1-piperidinethiocarboxamide, m.p. 94°–95°C.

EXAMPLE 12

Reaction of 3-amino-6-ethoxypyridine [Chichibabin et al., J. Russ. Phys.-Chem. Soc. 50, 471–83 (1920); C.A. 18, 1494 (1924)]; 3-amino-6-propoxypyridine; 3-amino-6-butoxypyridine [both disclosed by Binz et al., Ber. 68B, 315–24 (1935)]; 2-amino-6-ethoxypyridine [den Hertog et al., Rec. trav. chim. 55, 122–30 (1936)]; and 2-amino-5-ethoxypyridine [Koenig et al., Ber. 61B, 1022–30 (1928)] with thiophosgene and aqueous sodium bicarbonate using the procedure described above in Example 1 affords, respectively, 6-ethoxy-2-pyridylisothiocyanate; 6-propoxy-3-pyridylisothiocyanate; 6-butoxy-3-pyridylisothiocyanate; 6-ethoxy-2-pyridylisothiocyanate; and 5-ethoxy-2-pyridylisothiocyanate.

The latter, on reaction with 2,6-dimethylpiperidine using the procedure described above in Example 1 affords, respectively, N-(6-ethoxy-3-pyridyl)-2,6-dimethyl-1-piperidinethiocarboxamide; N-(6-propoxy-3-pyridyl)-2,6-dimethyl-1-piperidinethiocarboxamide; N-(6-butoxy-3-pyridyl)-2,6-dimethyl-1-piperidinethiocarboxamide; N-(6-ethoxy-2-pyridyl)-1-piperidinethiocarboxamide; and N-(5-ethoxy-2-pyridyl)-2,6-dimethyl-1-piperidinethiocarboxamide.

EXAMPLE 13

To a solution of 11.3 g. (0.1 mole) of thiophosgene in methylene dichloride was added simultaneously, and with vigorous stirring, a solution of 10.8 g. (0.1 mole) of 2-amino-6-methylpyridine in 150 ml. of methylene dichloride and 170 ml. of a 10% aqueous solution of sodium bicarbonate using the procedure described above in Example 1.

The material isolated from the organic layer, consisting of 6-methyl-2-pyridylisothiocyanate, was reacted directly, without further purification, with 10 ml. of 2,6-dimethylpiperidine using the procedure described above in Example 1. The solid material which separated from the reaction mixture was recrystallized with charcoaling from n-hexane to give 3.7 g. of N-(6-methyl-2-pyridyl)-2,6-dimethylpiperidinethiocarboxamide, m.p. 103°–105°C.

EXAMPLE 14

Reaction of 3-amino-6-ethylpyridine; 3-amino-6-propylpyridine; 3-amino-6-butylpyridine and 3-amino-6-sec.-butylpyridine [all disclosed by Graber, Can. J. Chem. 31, 1181–8 (1953)] with thiophosgene in the presence of aqueous sodium bicarbonate using the procedure described above in Example 1 affords, respectively, 6-ethyl-3-pyridylisothiocyanate; 6-propyl-3-pyridylisothiocyanate; 6-butyl-3-pyridylisothiocyanate and 6-sec.-butyl-3-pyridylisothiocyanate.

Reaction of the latter with 2,6-dimethylpiperidine using the procedure described above in Example 1 affords, respectively N-(6-ethyl-3-pyridyl)-2,6-dimethyl-1-piperidinethiocarboxamide; N-(6-propyl-3-pyridyl)-2,6-dimethyl-1-piperidinethiocarboxamide; N-(6-butyl-3-pyridyl)-2,6-dimethyl-1-piperidinethiocarboxamide; and N-(6-sec.-butyl-3-pyridyl)-2,6-dimethyl-1-piperidinethiocarboxamide.

EXAMPLE 15

A solution of 10.1 g. (0.1 mole) of triethylamine, 20 ml. of pyridine and 40 ml. of carbon disulfide contained in a 3-necked flask equipped with a mechanical stirrer, a thermometer, and a dropping funnel was cooled in a dry ice bath to −10°C. and treated dropwise with stirring with a solution of 9.41 g. (0.1 mole) of 3-aminopyridine in 40 ml. of pyridine. When addition was complete, the reaction mixture was treated with a solution of 20.63 g. (0.1 mole) of dicyclohexylcarbodiimide in 20 ml. of pyridine, and the mixture stirred at −10°C. for three hours. The mixture was kept cool in a refrigerator for about 48 hours and the solid which separated was removed by filtration. The filtrate was taken to dryness leaving a residual oil which was dissolved in benzene and chilled. The solid which separated was removed by filtration, and the filtrate was once again taken to dryness leaving an oily residue which was distilled in vacuo to give 3 -pyridylisothiocyanate, b.p. 84°–89°C./4.4 mm., $n_D^{27}$ 1.6598.

A solution of 3 g. (0.025 mole) of 3-pyridylisothiocyanate dissolved in 10 ml. of absolute ether was treated with a solution of 4 ml. of 2,6-dimethylpiperidine in 10 ml. of absolute ether using the procedure described above in Example 1. The solid which separated from the reaction mixture was collected and recrystallized from acetonitrile to give 7.0 g. of N-(3-pyridyl)-2,6-dimethyl-1-piperidinethiocarboxamide, m.p. 85°–87°C.

EXAMPLE 16

To a vigorously stirred mixture of 11.4 g. (0.1 mole) of thiophosgene, 100 ml. of water and about 20 ml. of methylene dichloride was added dropwise a solution containing 0.1 mole of 3-amino-2,6-dimethoxypyridine in about 400 ml. of methylene dichloride. The reaction was worked up using the procedure described above in Example 1, and there was thus obtained 7.8 g. of 2,6-dimethox-3-pyridylisothiocyanate, m.p. 55°–56°C.

A solution of 3.4 g. (0.017 mole) of 2,6-dimethoxy-3-pyridylisothiocyanate in 150 ml. of diethyl ether was treated with a solution of an equimolar amount of 2,6-dimethylpiperidine in diethyl ether. The solid which separated was collected and dried to give 5 g. of N-(2,6-dimethoxy-3-pyridyl)-2,6-dimethyl-1-piperidinethiocarboxamide, m.p. 77°–79°C.

EXAMPLE 17

A solution of 8 g. (0.037 mole) of 5-bromo-2-pyridylisothiocyanate in 200 ml. of absolute ether was treated with a solution of 5 ml. of 2,5-dimethylpyrrolidine in 50 ml. of absolute ether. The product crystallized from the reaction mixture on cooling and was collected and dried to give 5.4 of N-(5-bromo-2-pyridyl)-2,5-dimethyl-1-pyrrolidine-thiocarboxamide, m.p. 120°–122°C.

EXAMPLE 18

A solution of 10 g. (0.047 mole) of 5-bromo-2-pyridylisothiocyanate in 100 ml. of n-hexane was treated with a solution of 6 ml. of piperidine in 50 ml. of hexane. The solid which separated was collected and dried to give 3.5 g. of N-(5-bromo-2-pyridyl)-1-piperidinethiocarboxamide, m.p. 110°–112°C.

EXAMPLE 19

To a vigorously stirred solution of 22.6 g. (0.2 mole) of thiophosgene in 250 ml. of methylene dichloride was added dropwise with stirring and simultaneously from two separate dropping funnels a solution of 340 ml. of 10% aqueous sodium bicarbonate and 21.6 g. (0.2 mole) of 5-methyl-2-aminopyridine in 150 ml. of methylene dichloride. The reaction was worked up using the procedure described above in Example 1, and there was thus obtained 5-methyl-2-pyridylisothiocyanate.

A solution of the latter, without further purification, was dissolved in about 400 ml. of diethyl ether and the solution treated with 22.8 g. (0.2 mole) of 2,6-dimethylpiperidine. The solid which separated was collected and dried to give 8.2 g. of N-(5-methyl-2-pyridyl)-2,6-dimethyl-1-piperidinethiocarboxamide, m.p. 109°–111°C.

EXAMPLE 20

To a vigorously stirred solution of 57 g. (0.5 mole) of thiophosgene in 100 ml. of diethyl ether was added dropwise with stirring a solution of 94 g. (1.0 mole) of 2-aminopyridine in 1200 ml. of absolute ether. Without isolation of the resulting 2-pyridylisothiocyanate, the mixture was treated directly with 150 g. (0.67 mole) of 2,6-dimethylpiperidine using the procedure described above in Example 1. The material which separated was collected and recrystallized from tetrahydrofuran to give 13.0 g. of N-(2-pyridyl)-2,6-dimethyl-1-piperidinethiocarboxamide, m.p. 140°–142°C.

EXAMPLE 21

A solution of about 1.0 mole of 2-pyridylisothiocyanate in about 1,300 ml. of absolute ether was treated with 94 g. (1.0 mole) of 2-methylpiperidine using the procedure described above in Example 1. The material which was obtained from the organic solution (after removal of a solid precipitate by filtration) was recrystallized from cyclohexane to give 2.7 g. of N-(2-pyridyl)-2-methyl-1-piperidinethiocarboxamide, m.p. 95°–96°C.

EXAMPLE 22

A solution of about 0.5 mole of 5-methyl-2-pyridylisothiocyanate in about 800 ml. of ethyl acetate was treated with 49.5 g. (0.5 mole) of 2-methylpiperidine using the procedure described above in Example 1. The material obtained from the organic layer, after extraction of the latter with water, was recrystallized from cyclohexane to give 5.2 g. of N-(5-methyl-2-pyridyl)-2-methyl-1-piperidinethiocarboxamide, m.p. 112°–114°C.

EXAMPLE 23

To a vigorously stirred solution of 5.6 g. (0.05 mole) of thiophosgene in 25 ml. of chloroform was added dropwise with vigorous stirring from two separate dropping funnels a solution of 8.35 g. (0.05 mole) of ethyl 6-aminonicotinate [Saikachi et al., Pharm. Bull. (Japan) 3, 194-9 (1955)] in chloroform and 84 ml. of 10% aqueous sodium bicarbonate. When addition was complete the chloroform layer was separated, dried and taken to dryness to give an orange oil which slowly solidified to give 5-carbethoxy-2-pyridylisothiocyanate. The latter was dissolved in 200 ml. of absolute ether and the solution treated with 10 ml. of 2,6-dimethylpiperidine. The material which separated was collected and recrystallized from hexane to give 4 g. of N-(5-carbethoxy-2-pyridyl)-2,6-dimethyl-1-piperidinethiocarboxamide, m.p. 99°–102°C.

EXAMPLE 24

To a mixture of 69.5 g. (0.5 mole) of 2-amino-5-nitropyridine and 50 ml. of pyridine in 350 ml. of acetone was added rapidly and with stirring and external cooling a solution of 40.0 g. (0.5 mole) of acetyl chloride in 150 ml. of acetone. When addition was complete, the mixture was stirred with cooling for about ten minutes, then refluxed gently for forty-five minutes and cooled in an ice bath. The solid which separated from the cooled mixture was collected, washed first with acetone, then with water and dried to give 79.5 g. of 5-nitro-2-acetylaminopyridine, m.p. 199°–202.5°C.

In three separate runs, a total of 73.8 g. (0.41 mole) of the latter, dissolved in a total of 700 ml. of methanol, was reduced with hydrogen over a total of 3.0 g. of 10% palladium-on-charcoal under 50 pounds p.s.i. of hydrogen. When reduction was complete the catalyst was removed by filtration and the solvent removed in vacuo to give a total of 62.0 g. of 5-amino-2-acetylaminopyridine, m.p. 157°–159°C.

A mixture of 62.0 g. (0.41 mole) of 5-amino-2-acetylaminopyridine and 70 ml. of 37% aqueous formaldehyde in 120 ml. of 98% formic acid was heated on a steam bath for three hours and then allowed to cool. The solution was diluted with about 300 ml. of water and neutralized carefully by the portionwise addition of 150 g. of solid potassium carbonate. The mixture was extracted with 250 ml. of chloroform, and the organic layer was washed, dried and evaporated to dryness to give a solid residue which was recrystallized from ethyl acetate to give 43.7 g. of 5-dimethylamino-2-acetylaminopyridine, m.p. 167°–170°C.

The latter (43.7 g., 0.24 mole) was added to a solution of 20 g. of sodium hydroxide in 500 ml. of water and the mixture refluxed for one hour and fifteen minutes. The mixture was then cooled and extracted with chloroform and the chloroform extracts taken to dryness. The residual oil was distilled in vacuo at 83°–95°C./0.1-0.5 mm. to give a total of 31.1 g. of 2-amino-5-dimethylaminopyridine which slowly solidified on standing.

The latter (27.4 g., 0.20 mole) was converted to 5-dimethylamino-2-pyridylisothiocyanate using 22.8 g. (0.2 mole) of thiophosgene, 162 ml. of 10% sodium bicarbonate and 400 ml. of chloroform using the procedure described in Example 1. Without isolation, the product was dissolved in 15 ml. of absolute ether and treated with 15 ml. of 2,6-dimethylpiperidine using the procedure described in Example 1. There was thus obtained 8.3 g. of N-(5-dimethylamino-2-pyridyl)-2,6-dimethylpiperidinethiocarboxamide, m.p. 119°–121°C.

EXAMPLE 25

To a stirred mixture of 2740 g. (25.3 moles) of 2-amino-5-methylpyridine, 6900 ml. (49.4 moles) of triethylamine and 2000 ml. (32.9 moles) of carbon disulfide in a 9 gallon stainless steel pot having adequate ventilation to the atmosphere was added 2250 ml. of acetonitrile. The reaction temperature fell within five minutes from 25°C. to 12°C. but then rose over a period of forty-five minutes to 28°C. and a thick slurry had developed from crystallization of the product. An exterior cooling bath was then added to maintain the temperature around 35°C. After stirring for three hours, the mixture was allowed to stand at room temperature overnight, and the solid that had separated was collected, washed with ether and the product air-dried to give 6905 g. (95.6%) of triethylammonium (5-methyl-2-pyridyl)dithiocarbamate, m.p. 94°–95°C.

A stirred slurry of 4455 g. (15.6 moles) of triethylammonium (5-methyl-2-pyridyl)dithiocarbamate in 7 liters of methanol in a 9 gallon stainless steel pot was stirred and cooled to 10°C. To the mixture was added at 10°–15°C. over a period of one and a half hours 2437 g. (16.65 moles) of methyl iodide. The mixture remained a slurry at all times during addition of the methyl iodide and was kept well-stirred by use of two mixers. After stirring and further cooling to −10°C. using a dry ice/acetone bath over a period of three hours, the solid was collected, washed with 1.5 liters of methanol at −10°C., 2 liters of ether and 4 liters of hexane. After drying overnight under a hood, there was obtained 2688 g. (86.9%) of methyl (5-methyl-2-pyridyl)dithiocarbamate, m.p. 118°–130°C.

A mixture of 1859 g. (9.39 moles) of methyl (5-methyl-2-pyridyl)dithiocarbamate in 10 liters of acetonitrile in a 22 liter 3-necked flask was stirred and heated to reflux. To the resulting pale yellow solution was added at reflux temperature over a six hour period a solution of 1590 ml. (11.26 moles) of 2,6-dimethylpiperidine in 4 liters of acetonitrile and the clear pale orange solution refluxed for an additional two hours. During the entire eight hour reaction period, a steady stream of nitrogen was bubbled into the mixture below the surface of the solution. At the end of the reaction period, the mixture was allowed to cool to room temperature overnight. Solvent was removed by distillation over a steam bath under water aspirator and the resulting slurry cooled to 8°C. The resulting crystals were collected, washed with 1 liter of acetonitrile at 5°C., then with 2 liters of ether and finally with 2 liters of hexane. There was thus obtained 1825 g. of N-(5-methyl-2-pyridyl)-2,6-dimethyl-1-piperidinethiocarboxamide, m.p. 111°–116°C.

A second crop of product, 450 g., m.p. 108°–113°C. was obtained from the filtrate and washes from the main batch to give a total of 2275 g. (92.1%) of product.

Data obtained on certain of the compounds of the invention in anthelmintic studies in mice against the Trichostrongyle nematode, N. dubius, the pinworm, S. obvelata, and the tapeworm, H. nana, and in dogs against the hookworm, A. caninum, using the test procedures described above are given in the table below. Results, obtained in oral administration, are expressed either in terms of the percent of animals cleared at a particular dose level (e.g. 100%/200 × 4 or 100 percent cleared at a daily dose of 200 mg./kg. given daily for four days) or as an $ED_{50}$ obtained by administration of graded single doses. The compounds are identified by the example number above where the preparation of each of the compounds is described.

| Example | N. dubius | S. ovelata | H. nana | A. caninum |
|---|---|---|---|---|
| 1 | 1.8± 0.9 | Inactive | Inactive | 75%/6.25×1 |
| 3 | 9.25±2.15 | Inactive | Inactive | — |
| 5 | 100%/200×4 | Inactive | Inactive | Inactive/50×1 |
| 6 | 98.6%/200×4 | Inactive | Inactive | Inactive/50×1 |
| 7 | 100%/200×4 | Inactive | Inactive | — |
| 9 | 4.1±0.82 | 100%/200×4 | 50%/200×4 | 100%/200×1 |
| 10 | 100%/200×4 | Inactive | Inactive | Inactive/50×1 |
| 11 | 64%/200×4 | Inactive | Inactive | — |
| 13 | 82%/200×4 | Inactive | Inactive | Inactive/50×1 |
| 15 | 35%/200×4 | Inactive | Inactive | Inactive/50×1 |
| 16 | 22%/200×4 | Inactive | Inactive | Inactive/100×3 |
| 17 | 36.6%/200×4 | Inactive | Inactive | — |
| 18 | 34.4%/200×4 | Inactive | Inactive | — |
| 19,25 | 6.4±3.3 | Inactive | Inactive | 91%/12.5×1 |
| 20 | 23±5.8 | Inactive | Inactive | 100%/100×2 |
| 21 | 100%/200×4 | Inactive | Inactive | — |
| 22 | 100%/200×4 | Inactive | Inactive | Inactive/100×2 |
| 23 | 64.7%/200×4 | Inactive | 100%/200×4 | 50%/50×3 |
| 24 | 10.8±3.0 | Inactive | Inactive | 100%/25×1 |

In addition N-(5-methyl-2-pyridyl)-2,6-dimethyl-1-piperidinethiocarboxamide, described in Examples 19 and 25, when administered orally to dogs infected with the ascarid infections, Toxocara canis and Toxascaris leonina, gave 50% clearance at 6.25 mg./kg. and 71% clearance at 12.5 mg./kg.

In contrast to the above-listed compounds of the invention, all of which are active against N. dubius, and some of which are also selectively active against pinworms, tapeworms and hookworms, we have found that the known compound, N-(2-pyridyl)-1-piperidinethiocarboxamide [which has been described by Knott, J. Chem. Soc. 1644 (1956) only as a characterizing derivative], when administered orally at four daily doses of 200 mg./kg. to mice, gave only 7.8% clearance of N. dubius and 0% clearance of S. obvelata and H. nana. These results indicate such a low order of activity that the compound is clearly ineffective as an anthelmintic agent.

We claim:

1. A compound having the formula

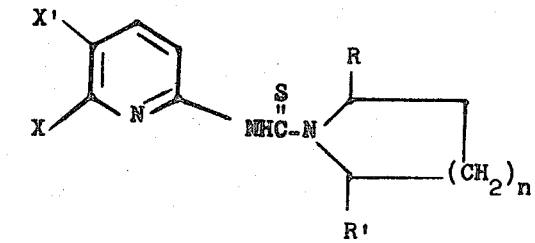

wherein:
X is hydrogen, lower-alkyl or lower-alkoxy;
X' is hydrogen, bromine, chlorine, lower-alkyl, carbo-lower-alkoxy or di-lower-alkylamino;
R is lower-alkyl or hydroxymethyl;
R' is hydrogen or lower-alkyl; and n is 1 or 2 except that:
  a. when X is hydrogen, X' is lower-alkyl and n is 2, either both R and R' are lower-alkyl or one is hydrogen and the other lower-alkyl; and
  b. when X is hydrogen, X' is lower-alkyl and n is 1, R and R' are not both lower-alkyl.

2. A compound according to claim 1 having the formula

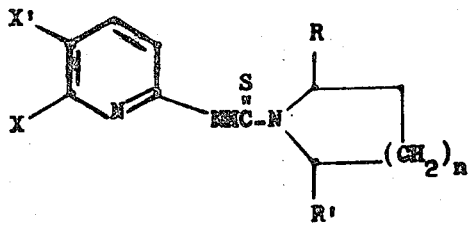

wherein:
X is hydrogen, lower-alkyl, or lower-alkoxy;
X' is hydrogen, bromine, chlorine, lower-alkyl, carbo-lower-alkoxy or di-lower-alkylamino;
R is lower-alkyl or hydroxymethyl;
R' is hydrogen or lower-alkyl; and
n is 2.

3. A compound according to claim 1 having the formula

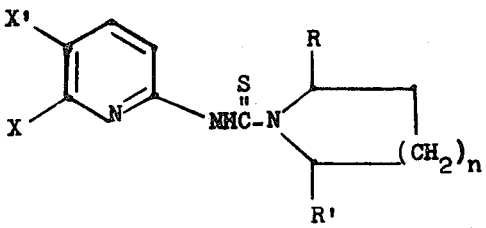

wherein:
X is hydrogen, lower-alkyl or lower-alkoxy;
X' is hydrogen, bromine, chlorine, carbo-lower-alkoxy or di-lower-alkylamino;
R is lower-alkyl;
R' is hydrogen or lower-alkyl; and
n is 1.

4. N-(5-Chloro-2-pyridyl)-2,6-dimethyl-1-piperidinethiocarboxamide according to claim 2.

5. N-(5-Chloro-2-pyridyl)-2-methyl-1-piperidinethiocarboxamide according to claim 2.

6. N-(5-Chloro-2-pyridyl)-2-(hydroxymethyl)-1-piperidinethiocarboxamide according to claim 2.

7. N-(5-Bromo-2-pyridyl)-2,6-dimethyl-1-piperidinethiocarboxamide according to claim 2.

8. N-(5-Bromo-2-pyridyl)-2-methyl-1-piperidinethiocarboxamide according to claim 2.

9. N-(6-Methyl-2-pyridyl)-2,6-dimethylpiperidinethiocarboxamide according to claim 2.

10. N-(2-Pyridyl)-2,6-dimethyl-1-piperidinethiocarboxamide according to claim 2.

11. N-(2-Pyridyl)-2-methyl-1-piperidinethiocarboxamide according to claim 2.

12. N-(5-Carbethoxy-2-pyridyl)-2,6-dimethyl-1-piperidinethiocarboxamide according to claim 2.

13. N-(5-Dimethylamino-2-pyridyl)-2,6-dimethylpiperidinethiocarboxamide according to claim 2.

14. N-(5-Chloro-5-2-pyridyl)-2,5-dimethyl-1-pyrrolidinethiocarboxamide according to claim 3.

15. N-(5-Bromo-2-pyridyl)-2,5-dimethyl-1-pyrrolidinethiocarboxamide according to claim 3.

16. N-(5-Methyl-2-pyridyl)-2,6-dimethyl-1-piperidinethiocarboxamide according to claim 2.

17. N-(5-Methyl-2-pyridyl)-2-methyl-1-piperidinethiocarboxamide according to claim 2.

18. A process for preparing a compound according to claim 1 having the formula

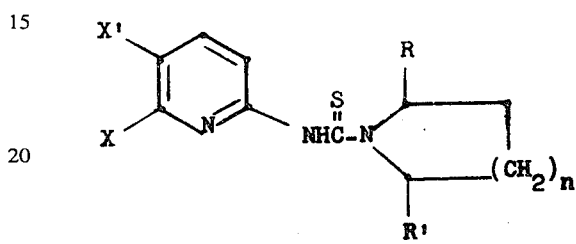

wherein:
X is hydrogen, lower-alkyl or lower-alkoxy;
X' is hydrogen, bromine, chlorine, lower-alkyl, carbo-lower-alkoxy or di-lower-alkylamino;
R is lower-alkyl or hydroxymethyl;
R' is hydrogen or lower-alkyl; and
n is 1 or 2 except that:
  a. when X is hydrogen, X' is lower-alkyl and n is 2, either both R and R' are lower-alkyl or one is hydrogen and the other lower-alkyl; and
  b. when X is hydrogen, X' is lower-alkyl and n is 1, R and R' are not both lower-alkyl
which comprises reacting a 2-pyridylamine having the formula:

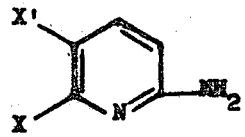

with carbon disulfide in the presence of a tri-lower-alkylamine; reacting the resulting tri-lower-alkylammonium 2-pyridyldithiocarbamate having the formula:

with a lower-alkyl halide, R''Hal; and reacting the resulting lower-alkyl 2-pyridyldithiocarbamate having the formula

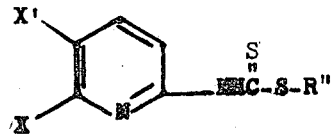

with a polymethyleneimine having the formula

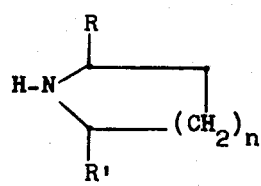

where X, X', R, R' and $n$ have the meanings given above, Am represents a tri-lower-alkylamine and R" represents lower-alkyl.

19. A process according to claim 18 for preparing N-(5-methyl-2-pyridyl)-2,6-dimethyl-1-piperidinethiocarboxamide which comprises reacting 2-amino-5-methylpyridine with carbon disulfide in the presence of a tri-lower-alkylamine, reacting the resulting tri-lower-alkylammonium (5-methyl-2-pyridyl)dithiocarbamate with a lower-alkyl halide; and reacting the resulting lower-alkyl (5-methyl-2-pyridyl)dithiocarbamate with 2,6-dimethylpiperidine.

* * * * *